United States Patent
West

(10) Patent No.: US 7,064,969 B2
(45) Date of Patent: Jun. 20, 2006

(54) MONOPOLAR DC TO BIPOLAR TO AC CONVERTER

(75) Inventor: Richard T. West, Pismo Beach, CA (US)

(73) Assignee: Distributed Power, Inc., San Luis Obispo, CA (US)

( * ) Notice: Subject to any disclaimer, the term of this patent is extended or adjusted under 35 U.S.C. 154(b) by 192 days.

(21) Appl. No.: 10/248,826

(22) Filed: Feb. 21, 2003

(65) Prior Publication Data

US 2004/0164557 A1    Aug. 26, 2004

(51) Int. Cl.
*H02M 7/5387* (2006.01)
*H02M 3/24* (2006.01)
*H02M 7/122* (2006.01)

(52) U.S. Cl. ........................ 363/132; 363/98

(58) Field of Classification Search ............. 363/56.01, 363/56.02, 95, 97, 98, 131, 132
See application file for complete search history.

(56) References Cited

U.S. PATENT DOCUMENTS

| | | | | |
|---|---|---|---|---|
| 3,737,755 A | * | 6/1973 | Calkin et al. | 363/17 |
| 6,232,742 B1 | * | 5/2001 | Wacknov et al. | 318/811 |
| 6,320,769 B1 | * | 11/2001 | Kurokami et al. | 363/56.03 |
| 6,469,919 B1 | * | 10/2002 | Bennett | 363/56.02 |
| 6,587,051 B1 | * | 7/2003 | Takehara et al. | 340/635 |
| 6,678,174 B1 | * | 1/2004 | Suzui et al. | 363/55 |

* cited by examiner

*Primary Examiner*—Matthew V. Nguyen

(57) ABSTRACT

This invention improves the performance and lowers the cost of DC to AC inverters and the systems where these inverters are used. The performance enhancements are most valuable in renewable and distributed energy applications where high power conversion efficiencies are critical. The invention allows a variety of DC sources to provide power thru the inverter to the utility grid without a transformer and at very high power conversion efficiencies. The enabling technology is a novel inverter circuit topology where the DC source is connected directly to the positive bus of the DC to AC converter and where a negative bus is generated from the positive bus with a flyback converter. The inverter power topology does include or require a transformer. The AC inverter output configuration can be either single-phase or three-phase. The AC inverter output can be either utility interactive or directly supply loads.

2 Claims, 2 Drawing Sheets

MONOPOLAR DC TO BIPOLAR TO AC CONVERTER

DETAILED DESCRIPTION OF THE INVENTION

The invention is more related to the power circuit topology of an inverter than the control methods. The inverter topology is novel while the control methods are known.

Figure 1:
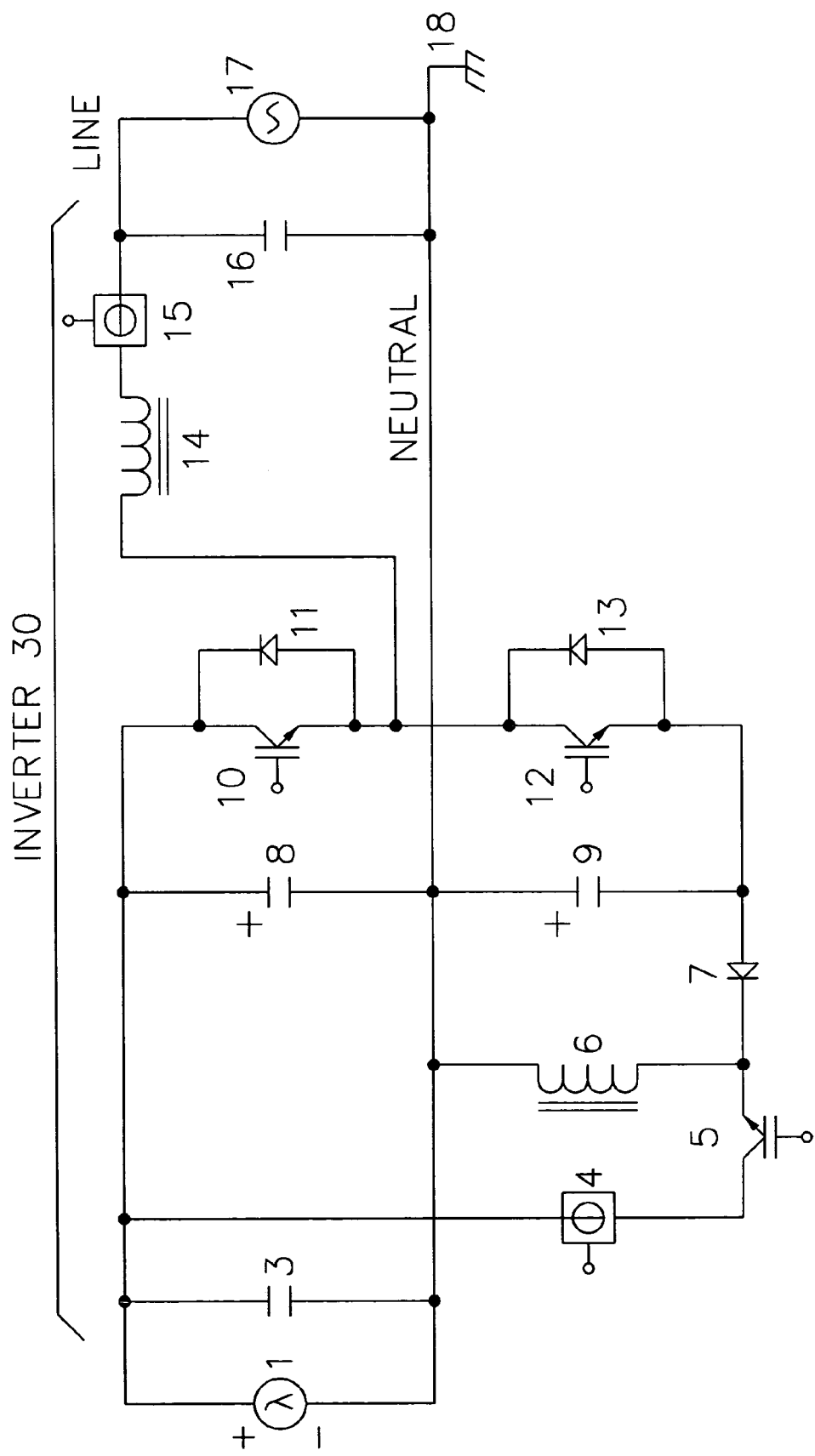

The preferred embodiment of the invention is shown in FIG. 1 and is illustrated as a system consisting of three components; an inverter 30, a photovoltaic array 1 and typical 60 cycle 120 Vac, residential, electric utility service 17. The system converts solar energy to electric power and functions as a distributed generator on the electric utility grid.

Photovoltaic cells produce power over a wide voltage range depending on the amount of sunlight, ambient temperature and wind speed. Additionally, there are National Electric Code and class-of-equipment restrictions that make photovoltaic arrays more cost effective when sized for a maximum of 600 Vdc. To source AC power into the electric utility grid, over the expected range of DC voltages, prior art utility-interactive inverters would either need an external 60 cycle distribution transformer or a dual boost converter input stage to achieve the proper voltage match. A distribution transformer decreases power conversion efficiency and adds to the overall system costs while a dual boost converter adds complexity to and lowers the conversion efficiency of the inverter.

The invention limits the number of conversions required from two, either the dual boost conversion and the DC-to-AC conversion or the DC-to-AC conversion and the 60 cycle step-up transformer conversion in the prior art, to 1½ conversions with said invention. This is because the DC-to-AC converter only processes ½ of the throughput power, the positive monopole, once. The negative monopole is processed twice as in the prior art. The prior art, dual boost converter is old technology and is well known.

In FIG. 1, a mono-polar photovoltaic array 1 is grounded with the return terminal connected to grounding electrode 18. photovoltaic array 1 is connected across energy storage capacitor 8. Capacitor 8, Insulated Gate Bipolar Transistor (IGBT) 5, inductor 6, diode 7 and capacitor 9 are configured as a typical, transformerless flyback converter. This circuit configuration is known.

The output of current sensor 4 is used in conjunction with the voltage sensed across capacitor 9 to regulate the voltage across capacitor 9. The voltage on capacitor 9 is regulated to slightly higher absolute value than the negative peak voltage on the utility grid 17.

With a properly sized photovoltaic array 1, there is positive bus or monopole across capacitor 8 and a negative bus or monopole across capacitor 9 both with respect to ground. The DC to AC converter is a known half-bridge configuration with IGBT switches 10 and 12 and freewheeling diodes 11 and 13. The Pulse Width Modulated (PWM) sinusoidal current regulation method for utility interactive inverters is known. Inductor 14 and capacitor 16 form a 2-pole filter that removes high frequency PWM components. The control circuit uses current sensor 15 to regulate sinusoidal current into the utility grid, synchronized with the utility grid voltage for unity power factor power transfer. The control circuit also uses current sensor 15 to precisely regulate DC current components to near zero. These control algorithms are known. The switching frequency is typically upwards of 20 kilohertz.

In the previous discussion, the terms "ground" and "grounding" refer to a common, relative, zero-voltage reference point. The point may or may not actually be connected to earth. A key attribute of this invention is the ability to directly connect one side of the DC source to the AC zero-voltage or neutral point of the AC system or AC load.

The preferred embodiment of the invention is illustrated using IGBT type semiconductor switching devices 5, 10 and 12. The invention is a specific arrangement of switching device and other components that connect to form a novel power circuit topology. The switching devices type does not define the topology. As such, Field Effect Transistors (FETs), Bipolar Junction Transistors (BJTs) or any substantially similar semiconductor switching device type could be substituted for any of the IGBT devices illustrated in FIG. 1

Figure 2:
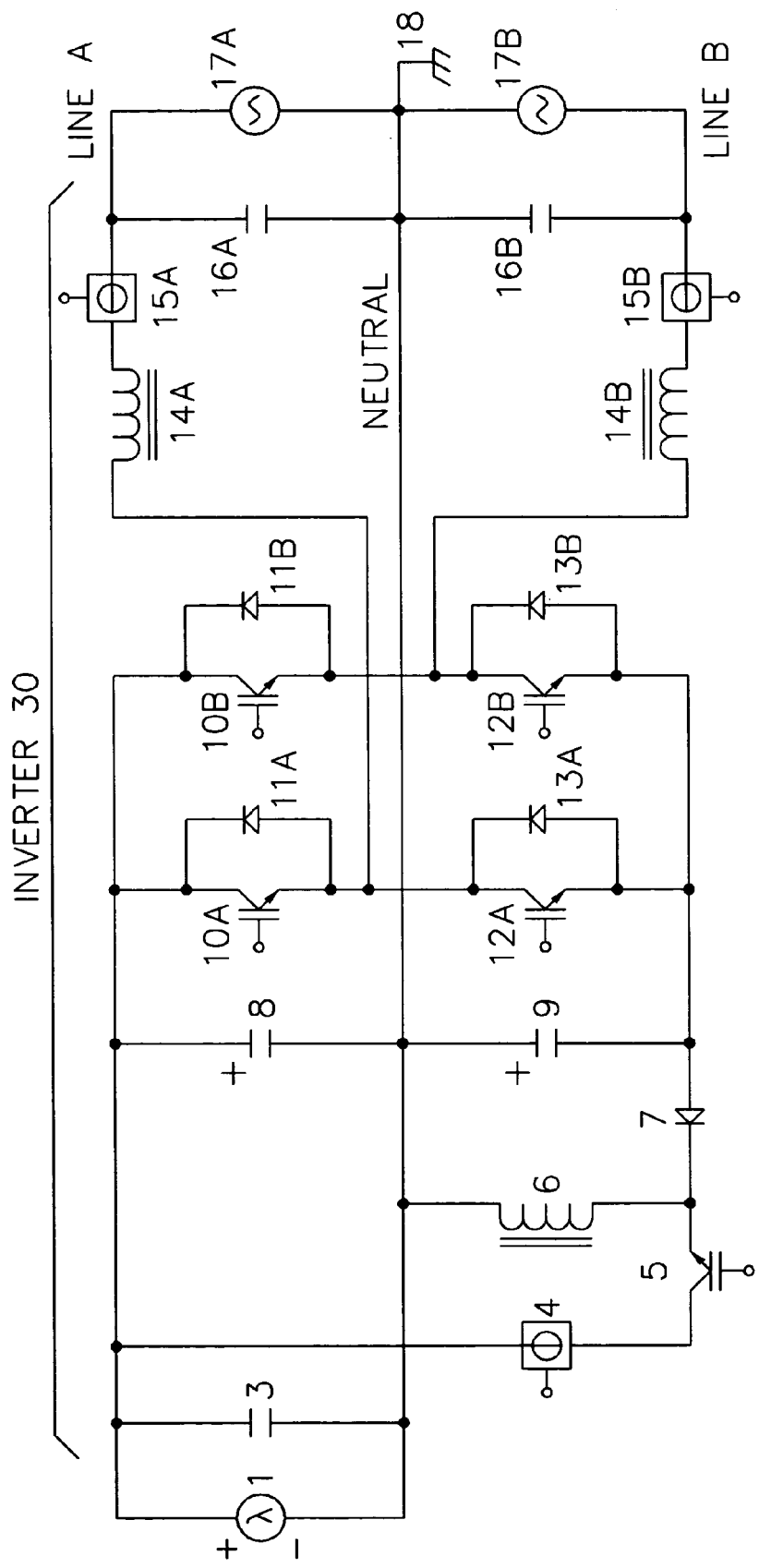

FIG. 2 illustrates an obvious extension of the circuit topology illustrated in FIG. 1. A second DC-to-AC half-bridge, generating power out of phase with the first half-bridge, is added to allow power to be sourced into a split-phase utility grid. Residential 120/240 Vac electric utility service in the United States is configured in this manner.

This invention facilitates high power, high frequency, lower cost DC-to-AC power conversion over a wide DC input range with a minimum number of conversions.

The invention claimed is:

1. A DC-to-AC power converter apparatus for converting power from a mono-polar DC source to an AC load where one side of said DC source is connected to the grounded, zero-voltage or neutral point of said AC load voltage, a point that is typically but not necessarily grounded with respect to earth and where said mono-polar DC source is connected directly across one of two DC buses and where a second DC bus of opposite polarity with respect to the first DC bus is created by an inverting DC-to-DC power converter where the mono-polar DC source is connected to the DC-to-DC converter input and the output of the DC-to-DC converter is connected to the second DC bus and where two semiconductor switching devices are connected in series across the two DC buses with the common point of the two semiconductor switching devices connecting through a filter inductor to an AC load, in a circuit arrangement typically know as a half-bridge, and where the DC-to-AC power conversion of one polarity of the AC waveform is accomplished with one power conversion stage and where the DC-to-AC power conversion of the opposite polarity of the AC waveform is accomplished with two power conversion stages.

2. A DC-to-AC power converter apparatus according to claim 1 having an additional half-bridge DC-to-AC converter section to drive split-phase loads.

* * * * *